United States Patent [19]

Beffa et al.

[11] 4,364,864
[45] Dec. 21, 1982

[54] 1:2 COBALT AND CHROMIUM COMPLEX UNSYMMETRICAL AZO DYES

[75] Inventors: Fabio Beffa, Riehen, Switzerland; Gerhard Back, Lörrach, Fed. Rep. of Germany; Hans U. Schütz, Basel, Switzerland

[73] Assignee: Ciba-Geigy Corporation, Ardsley, N.Y.

[21] Appl. No.: 18,089

[22] Filed: Mar. 6, 1979

Related U.S. Application Data

[63] Continuation of Ser. No. 842,853, Oct. 17, 1977, abandoned.

[30] Foreign Application Priority Data

Oct. 25, 1976 [LU] Luxembourg ............................ 76061

[51] Int. Cl.³ ...................... C09B 45/16; C09B 45/20; D06P 1/10; D06P 3/24
[52] U.S. Cl. ............................... 260/145 B; 260/147; 260/151; 260/162; 260/199
[58] Field of Search ...................................... 260/145 B

[56] References Cited

U.S. PATENT DOCUMENTS 2,623,871 12/1952 Schetty et al. ...................... 260/151
2,711,404 6/1955 Schetty ........................... 260/145 B
2,784,179 3/1957 Zickendraht et al. ...... 260/145 B X

FOREIGN PATENT DOCUMENTS 1059797 3/1954 France ............................ 260/145 B
1360942 4/1964 France ................................. 260/151
1360943 4/1964 France ................................. 260/147
352073 3/1961 Switzerland ........................ 260/147

Primary Examiner—Floyd D. Higel
Attorney, Agent, or Firm—Edward McC. Roberts

[57] ABSTRACT

Cobalt and chromium complex dyes which contain, bonded to a metal atom, one molecule of each of the azo compounds of the formula

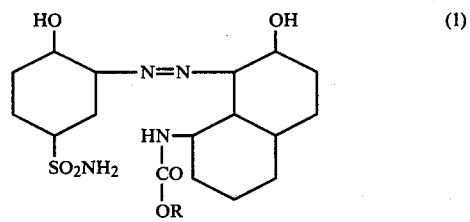

and

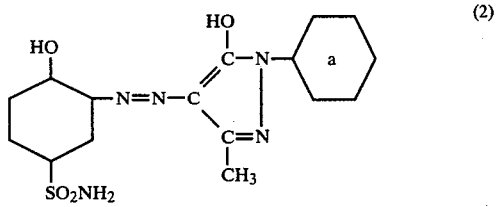

wherein R is methyl or ethyl and the phenyl ring a is unsubstituted or substituted by 1 to 2 chlorine atoms, nd mixtures thereof with the symmetrical 1:2 cobalt or chromium complex dyes of the azo compounds of the formulae (1) and (2), said dyes being useful in the dyeing and printing of a variety of materials, especially nitrogen containing materials such as silk, leather, polyamides, polyurethanes and especially wool to obtain level dyes having good fastness to light, washing, water, hot water, fulling, decatizing and carbonizing.

6 Claims, No Drawings

1:2 COBALT AND CHROMIUM COMPLEX UNSYMMETRICAL AZO DYES

This is a continuation of application Ser. No. 842,853 filed Oct. 17, 1977 and now abandoned.

The present invention relates to cobalt and chromium complex dyes which contain, bonded to a metal atom, one molecule of each of the azo compounds of the formula

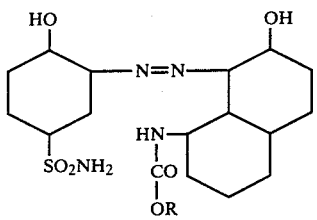
(1)

and

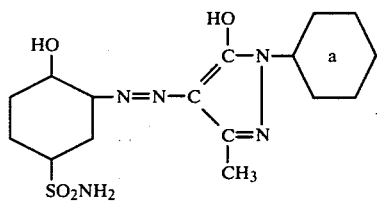
(2)

wherein R is methyl or ethyl and the phenyl ring a is unsubstituted or substituted by 1 to 2 chlorine atoms, and mixtures thereof with the symmetrical 1:2 cobalt or chromium complex dyes of the azo compounds of the formulae (1) and (2).

The dyes of the present invention can be obtained by reacting a mixture of the azo compounds of the formulae (1) and (2) above with a chromium or preferably cobalt donor.

The composition of the mixture can be varied by appropriate choice of the quantitative ratios of the dyes of the formulae (1) and (2) used for the metallising. Preferably equimolar amounts are used.

Purely asymmetrical chromium complexes of the formula

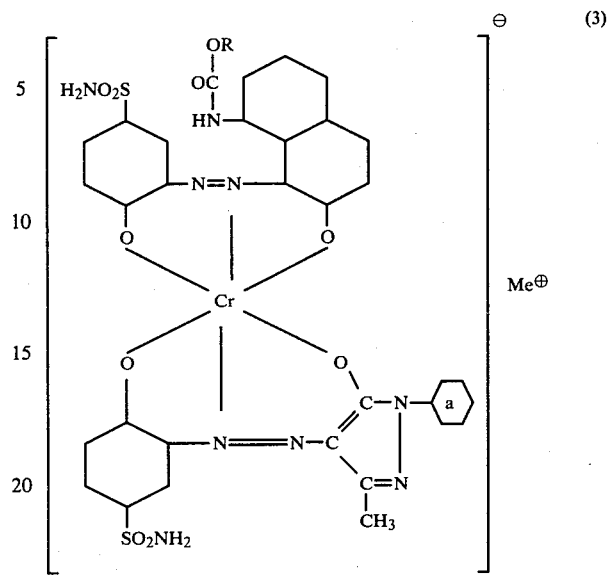
(3)

wherein R and a are as defined in formulae (1) and (2) and Me$^\oplus$ is a cation, are obtained by first preparing the 1:1 chromium complex of the dye of the formula (1) or (2) and then reacting this latter with the dye of the formula (2) or (1) to give the 1:2 chromium complex. These chromium complexes constitute a preferred group of the dyes of the invention.

The use of azo compounds of the formula (1), in which R is methyl, and those of the formula (2), in which the ring a is a chlorophenyl radical, in particular the m-chlorophenyl radical, is preferred.

The metallising is carried out by the conventional methods, for example with cobalt sulphate or cobalt acetate or with sodium chromium salicylate in weakly alkaline solution. When manufacturing the dyes of the formula (3), the 1:1 chromium complex of the azo compound of the formula (1) is preferably first prepared in acid solution and then subsequently reacted in a neutral to weakly alkaline medium with the azo compound of the formula (2). Preferably in this case the procedure described in German Offenlegungsschrift No. 2,363,635 is carried out in an organic solvent, for example n-butanol.

The novel metal complexes obtainable by the above process are advantageously isolated in the form of their salts, in particular alkali salts, in particular sodium or lithium salts, or also ammonium salts or salts of organic amines with positively charged nitrogen atom, and are suitable for dyeing and printing a variety of materials, in particular for dyeing nitrogen-containing materials, such as silk, leather and in particular wool, as well as for dyeing synthetic fibres obtained from polyamides or polyurethanes. In particular, they are suitable for dyeing from a weakly alkaline, neutral or weakly acid bath, for example an acetic acid bath. The dyeings obtained are level and have good fastness to light, washing, water, hot water, fulling, decatising and carbonising.

The invention is illustrated by the following Examples in which the parts and percentages are by weight unless otherwise indicated.

EXAMPLE 1

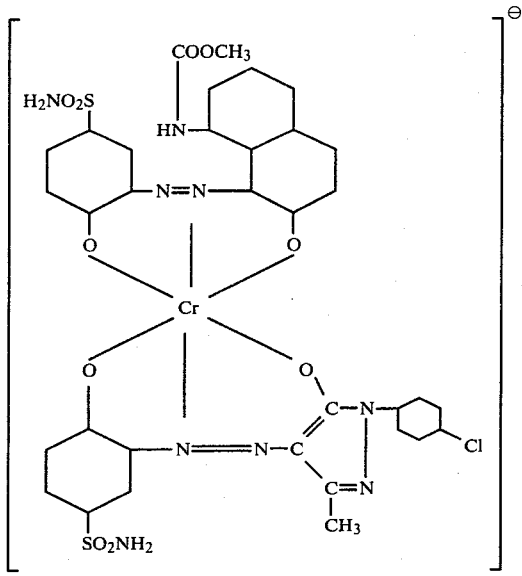

41.6 parts of the monoazo dye obtained from diazotised 2-amino-1-hydroxybenzene-4-sulphonamide and 1-carbomethoxyamino-7-hydroxynaphthalene are stirred in the form of a moist paste in 400 parts by volume of n-butanol and 28 parts of CrCl$_3$.6H$_2$O for 2 to 3 hours at a temperature between 115° and 117° C., while the water which forms is removed as an azeotrope. The reaction mixture is then allowed to cool to 50° C. After addition of 40.75 parts of the monoazo dye obtained from diazotised 2-amino-1-hydroxybenzene-4-sulphonamide and 1-(4'-chlorophenyl)-3-methyl-5-pyrazolone, and the dropwise addition of 12.5 to 13 parts by volume of a 30% sodium hydroxide solution, the reaction mixture is stirred again for 1 to 2 hours at 110° to 117° C. while separating the water of reaction as an azeotrope. When the reaction to give the mixed complex is complete, the batch is filtered clear to remove inorganic salts and concentrated. The slightly water-soluble complex of low salt content dyes wool or polyamide fibres from a neutral to weakly acid bath in brown shades of very good fastness properties.

Further brown mixed complex dyes which yield dyeings of similarly good fastness properties on wool and polyamide are obtained by using equimolar amounts of the dyes listed in the following table instead of the dyes used in this Example.

EXAMPLE 2

41.6 parts of the dye obtained from diazotised 2-amino-1-hydroxybenzene-4-sulphonamide and 1-carbomethoxyamino-7-hydroxynaphthalene as well as 40.75 parts of the dye obtained from diazotised 2-amino-1-hydroxybenzene-4-sulphonamide and 1-(3'-chlorophenyl)-3-methyl-5-pyrazolone are stirred at 80° to 90° C. in 1500 parts by volume of water with a cobalt sulphate solution (corresponding to 7.67 parts of cobalt) which has been made weakly alkaline with sodium hydroxide in the presence of 28.2 parts of Seignette salt, until the starting dye can no longer be detected.

When the complex formation is complete, the cobalt complex dye is precipitated by addition of sodium chloride and filtered. After drying, the reaction product is a dark powder which dissolves in water to give a brown solution and dyes wool and polyamide fabrics in very fast brown shades from a neutral to weakly acid bath.

A product which has properties similar to those of the above described cobalt complex is obtained by substituting 43.1 parts of the dye obtained from diazotised 2-amino-1-hydroxybenzene-4-sulphonamide and 1-carboethoxyamino-7-hydroxynaphthalene and 37.3 parts of the dye obtained from diazotised 2-amino-1-hydroxybenzene-4-sulphonamide and 1-phenyl-3-methyl-5-pyrazolone for the dyes used in Example 2.

EXAMPLE 3

43.1 parts of the monoazo dye obtained from diazotised 2-amino-1-hydroxybenzene-4-sulphonamide and 1-carboethoxyamino-7-hydroxynaphthalene together with 37.3 parts of the monoazo dye obtained from diazotised 2-amino-1-hydroxybenzene-4-sulphonamide and 1-phenyl-3-methyl-5-pyrazolone are stirred in 1500 parts by volume of water, and after addition of 325 parts by volume of a solution of sodium chromsalicylate (corresponding to 6.75 parts of chromium) the mixture is refluxed until the starting dyes can no longer be detected. When the chroming is complete, the chromium complex dye is precipitated by addition of sodium chloride and filtered. After drying, the product is a brown powder which dissolves in water to give a brown solution and dyes wool and polyamide fabrics in very fast brown shades from a neutral to weakly acid bath.

A product which has properties similar to those of the above described chromium complex is obtained by substituting 41.6 parts of the dye obtained from diazotised 2-amino-1-hydroxybenzene-4-sulphonamide and 1-carbomethoxyamino-7-hydroxynaphthalene and 40.75 parts of the dye obtained from diazotised 2-amino-1-hydroxybenzene-4-sulphonamide and 1-(3'-chlorophenyl)-3-methyl-5-pyrazolone for the dyes used in this Example.

DYEING DIRECTION FOR WOOL 100 parts of wool hand-knitting yarn are put at 50° C. into a dye bath which contains in 4000 parts of water 2 parts of the dye listed as No. 2 in the preceding table and 4 parts of ammonium sulphate. The liquor is brought to the boil in the course of 45 minutes and kept at this temperature for a further 45 minutes. The yarn, which is dyed brown, is removed from the bath, rinsed thoroughly and dried.

DYEING DIRECTION FOR POLYAMIDE 100 parts of texturised polyamide fabric (nylon 66) are put at 40° to 50° C. into a dyebath which contains in 4000 parts of water 2 parts of the dye of Example 1 and 3 parts of ammonium sulphate. The dyebath is heated to the boil in the course of 45 minutes and kept at this temperature for a further 60 minutes. The material, which is dyed brown, is then removed from the bath, rinsed thoroughly with cold water and dried.

What is claimed is:

1. A cobalt or chromium complex dye which contain, bonded to a metal atom, one molecule of each of the azo compounds of the formula

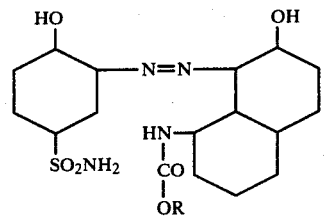

and

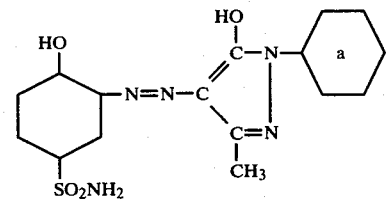

wherein R is methyl or ethyl and the phenyl ring a is unsubstituted or substituted by 1 to 2 chlorine atoms, or mixtures thereof with the symmetrical 1:2 cobalt or chromium complex dyes of the azo compounds of the formulae (1) and (2).

2. A cobalt complex according to claim 1.

3. A 1:2 chromium complex dye according to claim 1 of the formula

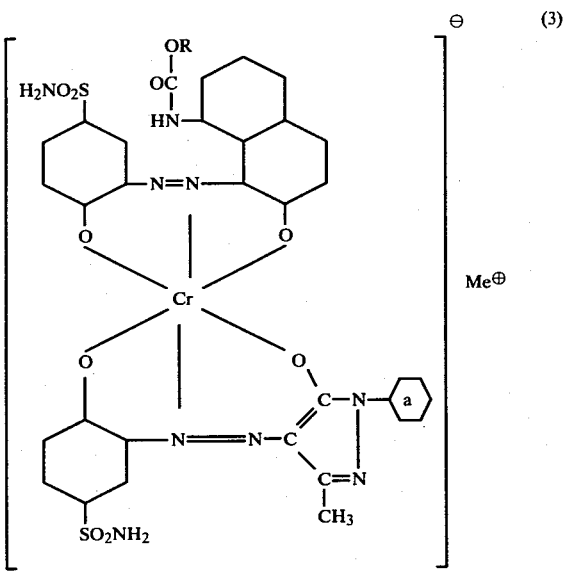

wherein R and a are as defined in claim 1 and M⊕ is a cation.

4. A cobalt or chromium complex according to claim 1 wherein R is methyl.

5. A cobalt or chromium complex according to claim 1 wherein the ring a is a chlorophenyl radical.

6. A cobalt or chromium complex according to claim 1 wherein the ring a is the m-chlorophenyl radical.

* * * * *